United States Patent [19]

Pfeiffer et al.

[11] Patent Number: 4,731,093
[45] Date of Patent: Mar. 15, 1988

[54] PROCESS FOR FIXING PIGMENTS ON FIBER MATERIALS AND SHEETLIKE STRUCTURES

[75] Inventors: Gerhard Pfeiffer, Bad Soden am Taunus; Erhard Doschke, Barsbüttel, both of Fed. Rep. of Germany

[73] Assignee: Hoechst Aktiengesellschaft, Frankfurt am Main, Fed. Rep. of Germany

[21] Appl. No.: 788,803

[22] Filed: Oct. 18, 1985

[30] Foreign Application Priority Data

Oct. 22, 1984 [DE] Fed. Rep. of Germany ....... 3438639

[51] Int. Cl.$^4$ .............................................. C09B 67/00
[52] U.S. Cl. .......................................... 8/583; 8/582; 8/516
[58] Field of Search .................. 8/558, 576, 582, 583, 8/DIG. 8

[56] References Cited

U.S. PATENT DOCUMENTS 4,268,266  5/1981  Hendricks et al. ...................... 8/576

FOREIGN PATENT DOCUMENTS

| 971871 | 5/1959 | Fed. Rep. of Germany . |
| 1134963 | 8/1962 | Fed. Rep. of Germany . |
| 1209097 | 1/1966 | Fed. Rep. of Germany . |
| 1190471 | 12/1973 | Fed. Rep. of Germany . |
| 1302085 | 1/1973 | United Kingdom . |

*Primary Examiner*—Paul Oberman
*Assistant Examiner*—John F. McNally

[57] ABSTRACT

Deposit buildup on pad rolls in pigment dyeings and the filling up of engravings and screens in pigment printing are frequent problems in practice which in certain circumstances cause appreciable expenses (cleaning costs, stoppages). More or less all the binder systems in aqueous dispersion which are at present customary in practice tend to build up deposits and/or fill up holes. It has now been found, according to the invention, that the stated disadvantages can be avoided by using for the above purpose water-soluble 2-component binder systems and otherwise producing pigment dyeings in conventional manner.

8 Claims, No Drawings

PROCESS FOR FIXING PIGMENTS ON FIBER MATERIALS AND SHEETLIKE STRUCTURES

It is known that pigments can be fixed on fiber materials and sheetlike structures to a high standard of fastness by applying them to the substrates to be printed or dyed from print pastes or padding liquors together with such substances as can be converted into water-insoluble films by chemical reaction.

The film-forming substances used are for example polymerization, polycondensation or polyaddition products which, for the abovementioned purpose, can be present as aqueous dispersions or in the form of water-soluble products.

The water-soluble form of binder systems for textile pigment dyeing and textile pigment printing offers special application advantages, since in these fields there is virtually no danger of deposit buildup on pad rolls, of filling up screen-printing screens and roller-printing engravings and of permanent hardening of printing underlays (idlers, blankets). Such systems are described for example in German patent Nos. 971,871, 1,209,097 and 1,134,963. German patent Nos. 971,871 and 1,209,097 describe, as binders, aqueous solutions of alkali-soluble condensate resins which are obtained from polybasic acids and polyhydric alcohols and contain reactive carboxyl groups and, as fixing agents, polyfunctional products which are obtained by reacting at least 2 moles of $\alpha, \beta$-alkylene-imines with 1 mole of phosphorus oxyhalides, cyanuric halides or terephthalic acid halides. Said German patent No. 1,134,963 gives, as pigment-binders, partially or completely hydrolyzed graft polymers of vinyl esters on polyalkylene glycol and, as fixing agents, completely or partially etherified aminoplast precondensates. In all the above-mentioned cases, fixing is effected, if desired after an intermediate drying, by dry heat treatment in an acid medium of the cloth treated with the pigments and binders and, in the processes of German patent Nos. 971,871 and 1,209,097, also by means of neutral or acid steaming. The disadvantages of the process described in German patent No. 971,871 are the toxic properties of the phosphorus derivatives and of the process described in German patent No. 1,209,097 the frequently inadequate wet fastness properties of the prints and dyeings.

German patent No. 1,910,471 describes a one-component binder system in aqueous solution comprising a polyester precondensate resin which reacts at temperatures above 130° C. with itself and which was obtained by reacting telomers containing carboxyl and/or carbonyloxycarbonyl groups with dibasic organic acids and diols, in the presence or absence of other monofunctional or polyfunctional alcohols or carboxylic acids, subsequent reaction with aminoplast precondensates which may be partially or completely etherified at the methylol groups, and subsequent neutralization with ammonia or volatile organic amines. This system has the disadvantage of complicated preparation and very limited durability of the binder.

It has now been found that it is possible to obtain, with advantage, pigment dyeings and prints on fiber materials and sheetlike structures having excellent fastness properties by applying to the substrate padding liquors or print pastes which, in addition to pigments, contain as pigment-binders, the aqueous solution of a synthetic resin obtained by polycondensation of aliphatic or aromatic dibasic or polybasic carboxylic acids with polyglycols and subsequent reaction with epoxy resin and, as fixing agent, the aqueous solution of a nonplasticized melamine resin and, as curing agent, potentially acid compounds, and fixing the paddings and prints, if desired after an intermediate drying, by dry heat.

Of particular importance for the purposes of the present process is a binder system which can be prepared by reacting adipic acid with polyethylene glycol 3000 and liquid bisphenyldiglycidyl ether.

The fact that the abovementioned pigment-binder and likewise the associated fixing agent are aqueous solutions is a distinct advance in the art insofar as the two components, unlike those in the abovementioned processes, have a long shelf life and are nontoxic and can be completely removed from pad rolls, screen-printing screens, roller-printing cylinders, idlers and blankets by simply rinsing with water, but on the other hand, after the fixing process, produce dyeings and prints having very good fastness properties and a soft hand. It is further noteworthy that heavyweight fabrics dyed with the system underlying the invention can be given a water-repellant finish significantly more efficiently than in the case of use of the previously customary pigment-binders in dispersion, since the water-soluble binder contains no dispersants which could interfere with the water-repellancy.

The synthetic resin used in the process as a binder for the pigments is prepared by reacting a dicarboxylic acid such as succinic acid or phthalic acid, preferably adipic acid, or anhydrides thereof with polydiols, for example polyether glycol having a molecular weight of 600 to 6000—for example polyethylene glycol or polypropylene glycol—preferably polyethylene glycol 3000. In the reaction with adipic acid, the polyethylene glycol 3000 is esterified to the half-ester. The remaining esterification to an acid number of less than 5, preferably below 2, is effected after addition of epoxy resin of the following structural formula:

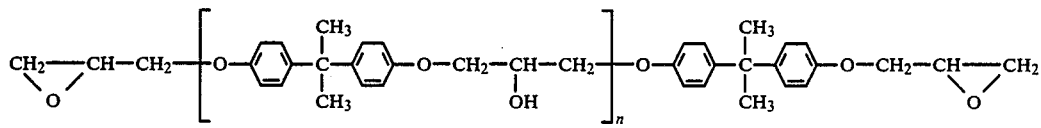

where n is 0–10, preferably 0–1.

The terminal epoxy groups react with the carboxyl groups of the above half-ester to form an ester bond and a hydroxyl group, as follows:

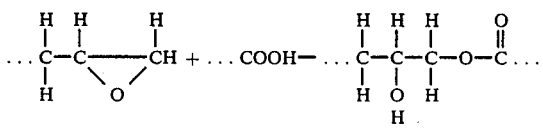

so that there are free hydroxyl groups available throughout the molecule for crosslinking with melamine resins.

Suitable pigments for the present process are the known pigment dyes of inorganic or organic origin. Examples are: titanium dioxide, iron oxide hydrates, metal powders, such as, for example, aluminum or bronze powder, and also carbon black, ultramarine blue and other oxidic or sulfidic inorganic pigments, further organic pigments such as azo pigments, quinoid and indigoid vat dyes, phthalocyanine dyes, bisoxazine dyes, perylenetetracarboxylic acid dyes and quinacridone dyes, as described for example in U.S. Pat. Nos. 2,844,484, 2,844,581 and 2,844,485. For the purposes of the present invention azo pigments are azo dyes which are obtained by coupling the diazo or tetrazo compounds of amines without water-solubilizing groups with the coupling components customary in pigment chemistry. Examples of possible coupling components are: naphthols, hydroxynaphtharylides, pyrazolones, acetoacetarylides and the like. If these dyes contain sulfo or carboxyl groups, they can find utility in the form of color lakes prepared with alkaline earth metal salts. Also suitable are water-soluble sulfur dyes present in the form of salts of their thiosulfonic acid and finely dispersed sulfur dyes, as well as disperse dyes whose chemical structure corresponds to that of nitramine, monoazo, disazo, anthraquinone, styrene, oxanthene and dioxanthene dyes.

The dyeing liquors prepared with the abovementioned binder system contain, in addition to pigment, the binder and fixer of the invention in a ratio preferably 3:1, the amount of the combination depending on the amount of the pigment contained in the padding liquor, and can, if desired, also contain as curing catalysts potentially acidic substances, such as, for example, ammonium nitrate, diammonium phosphate, ammonium oxalate, ammonium acetate, ammonium fluoride, ammonium thiocyanate, ammonium chloride, diethyl tartrate and the like. Crosslinking takes place between 140° C. and 220° C., preferably at 150°-180° C., in the course of 5 to 2 minutes. If the water-soluble pigment-binder system according to the invention is used for pigment printing, the abovementioned relations apply, while the print thickening used are aqueous synthetic thickening agents, for example based on polymeric acrylic acids, in the form of the ammonium salts.

The material to be dyed or printed in the present process can be sheetlike structures, such as films and fiber materials, such as woven fabrics, knitted fabrics, nonwovens and the like, for example based on natural or regenerated cellulose, acetylated cellulose, wool, silk or synthetic fibers, for example nylon, polyester, polyacrylonitrile or polyvinyl chloride fibers, and also glass fibers or asbestos. It is also possible to prepare pigment dyeings on paper, board and film of any kind.

EXAMPLE 1

A cotton fabric is padded on a pad-mangle with a dyeing liquor of the following composition using a liquor pickup of 60%:
20 parts by weight per liter of a 32% strength aqueous dispersion of copper phthalocyanine
100 parts by weight per liter of a 40% strength aqueous solution of the reaction product of adipic acid, polyethylene glycol 3000 and bisphenyldiglycidyl ether (binder solution)
30 parts by weight per liter of a 60% strength aqueous solution of a nonplasticized melamine resin (hexamethyl ether of hexamethylol melamine)
20 parts by weight per liter of a 25% strength aqueous solution of a polymerization product based on acrylic acid as an antimigration agent
20 parts by weight per liter of an organic acid-eliminating compound (hydrochloride of an amino alcohol)

After padding and drying the textile material is subjected to a temperature of 170° C. for 2 minutes. The result obtained is a blue dyeing which is distinguished by a soft hand and very good fastness properties.

The reaction product of adipic acid, polyethylene glycol 3000 and bisphenyldiglycidyl ether used as the binder is prepared as follows:

A melt of
75 parts by weight of polyethylene glycol (molecular weight about 3000) and
5 parts by weight of adipic acid
is esterified at about 170° C. in vacuo to an acid number of 35.

After addition of
10 parts by weight of bisphenyldiglycidyl ether (molecular weight about 400, epoxy value about 0.54)
the mixture is maintained at around 130° C. under atmospheric pressure until the acid number has dropped to below 2.

The viscosity of a sample after 1:1 dilution with water is then about 1000 mPa.s.

After addition of
134 parts by weight of water an approximately 40% by weight strength binder solution is obtained.

EXAMPLE 2

Heavyweight fabric in polyester/cotton is padded on a pad-mangle with a liquor of the following composition (using 70% liquor pickup):
50 parts by weight per liter of a 46% strength aqueous dispersion of chlorinated copper phthalocyanine
200 parts by weight per liter of the 40% strength aqueous synthetic resin solution described in Example 1 as binder
80 parts by weight per liter of a 25% strength aqueous solution of a polymerization product based on acrylic acid as an antimigration agent
25 parts by weight per liter of a 25% strength emulsion of a perfluorinated polyacrylate ester
20 parts by weight per liter of a 33% strength aqueous solution of diammonium phosphate After padding and drying, the textile material is subjected to a temperature of 150° C. for 5 minutes. The result obtained is a green dyeing having very good fastness properties and a high degree of water-repellancy, which makes it possible to use the cloth as a material for tents, awnings, camping articles and tarpaulins.

EXAMPLE 3

A cotton fabric is padded with a liquor as described hereinafter (liquor pickup 70%):
30 parts by weight of ®Hydrosol Blue B Colour Index No. 53441) are dissolved in
400 parts by weight of hot water. After cooling down to 30° C.
30 parts by weight of the melamine resin solution mentioned in Example 1 are added. This is followed by addition of 60 parts by weight of the aqueous binder solution described in Example 1 and, finally,
20 parts by weight of a 33% strength aqueous solution of diammonium phosphate. Subsequently the liquor is made up to
1 liter with water, and the fabric is padded, dried and fixed at 170° C. for 2 minutes.

The result obtained is a blue dyeing having good to very good fastness properties.

EXAMPLE 4

A polyester fabric is padded on a pad-mangle with a liquor which contains per liter the following additives (liquor pickup 60%):
30 parts by weight of ®Samaron Orange HB (Colour Index No. 26080)
30 parts by weight of the aqueous binder solution described in Example 1
10 parts by weight of the aqueous melamine resin solution mentioned in Example 1
10 parts by weight of a 33% strength solution of 2-methylpropanol hydrochloride After padding and drying, the textile material is subjected to a temperature of 210° C. for 1 minute. The result obtained is an orange-brown dyeing which is distinguished by a soft hand and very good fastness properties.

EXAMPLE 5

A nylon fabric is printed with a print paste of the following composition:
30 parts by weight of a 42% strength aqueous dispersion of 5,5-dichloro-7,7-dimethylthioindigo
150 parts by weight of the aqueous binder solution mentioned in Example 1
50 parts by weight of the aqueous melamine resin solution mentioned in Example 1
130 parts by weight of a copolymer dispersion containing polyacrylic acid
615 parts by weight of water
254 parts by weight of 25% strength ammonia After printing and drying, the fabric is fixed at 170° C. for 2 minutes. The result obtained is a brilliant reddish violet print having very good fastness properties.

We claim:

1. In a process for fixing pigments on fiber materials and sheet-like structures by means of curable synthetic resins or synthetic resin precursors which are cured by cross-linking at elevated temperatures in the presence of an acid or a compound which acts as an acid under the reaction conditions to form a water-insoluble film in order to adhere to the applied pigment on the surface of the substrate, the improvement which comprises: applying to the substrate a padding liquor or print paste which, in addition to pigment, contains a pigment-binder system comprising:
   (I) the aqueous solution of an essentially non-cross-linked polyester resin obtained by polycondensation of aliphatic or aromatic dibasic or polybasic carboxylic acids with polyetherdiols to the semi-ester thereof and subsequent reaction with aliphatic or aromatic epoxy resins under continued esterification of the semi-ester up to an acid number of less than 5 to yield a polycondensate still having available free hydroxyl groups for cross-linking,
   (II) a fixing agent which comprises the aqueous solution of a non-plasticized phenol-, urea-, or melamine-aldehyde resin, and
   (III) as curing agent a compound which acts as an acid under the reaction conditions,
and after padding or printing, fixing by dry heat.

2. The process as claimed in claim 1, wherein the binder (I) used is a polyester resin produced from an aliphatic or aromatic dicarboxylic acid or anhydride thereof with a polyetherdiol and a fluid bisphenyldiglycidyl ether as the epoxy resin, and the fixing component (II) used is the aqueous or water-miscible solution of a curing resin prepared from phenol-, urea-, or melamine-formaldehyde condensation products which are unetherified or partially or fully etherified at the methylol group.

3. The process as claimed in claim 2, wherein said dicarboxylic acid in component (I) is succinic acid, phthalic acid or adipic acid, or an anhydride thereof.

4. The process as claimed in claim 2, wherein said polyetherdiol in component (I) is a polyalkylene glycol selected from polyethylene glycol or polypropylene glycol having a molecular weight of 600 to 6000.

5. The process as claimed in claim 2, wherein said epoxy resin in component (I) is a fluid bisphenyldiglycidyl ether of the structural formula

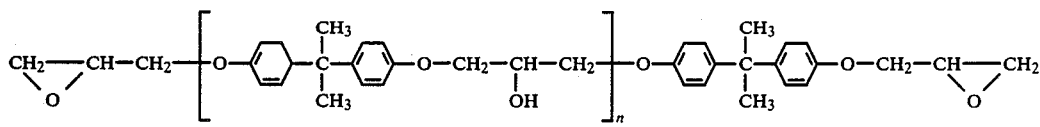

wherein n is 0-10.

6. The process as claimed in claim 2, wherein the components (I) and (II) are used in a weight ratio of about 3:1.

7. The process as claimed in claim 5, wherein the binder (I) used in a polyester resin produced from adipic acid with polyethylene glycol having a molecular weight of about 3000, the components (I) and (II) being used in a weight ratio of 3:1, and with a fluid bisphenyldiglycidyl ether of the structural formula given in claim 5, wherein n is 0 or 1, which polyester resin has an acid number of below 2, and in which the fixing component (II) used is hexamethylolmelamine hexamethylether.

8. The process as claimed in claim 1, wherein said process includes an intermediate drying step after said padding or printing and before said fixing.

* * * * *